Figure 8:
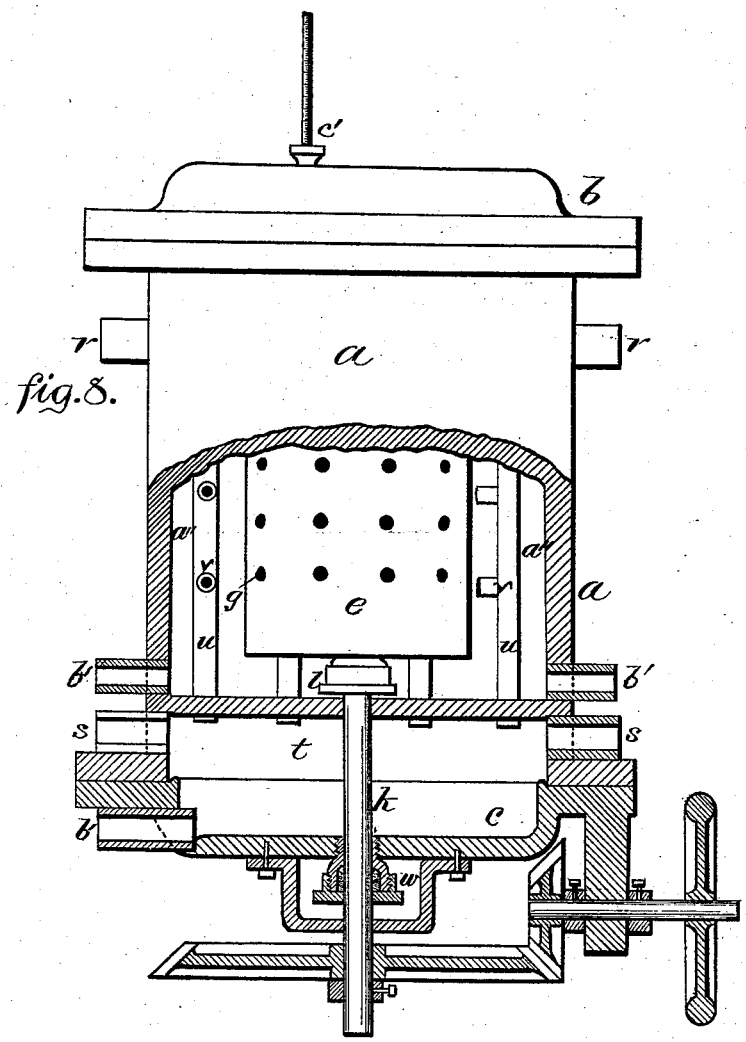

(No Model.)  3 Sheets—Sheet 1.
G. H. MOORE.
FILTER.
No. 244,471. Patented July 19, 1881.
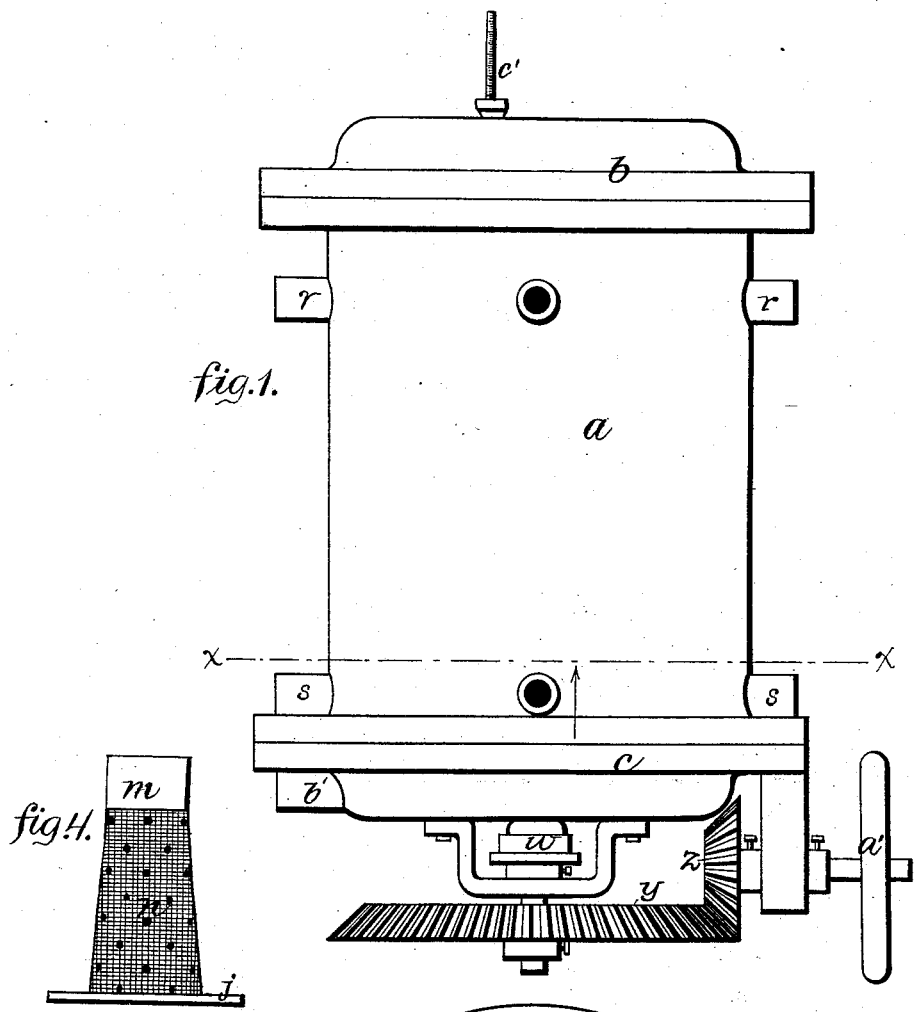
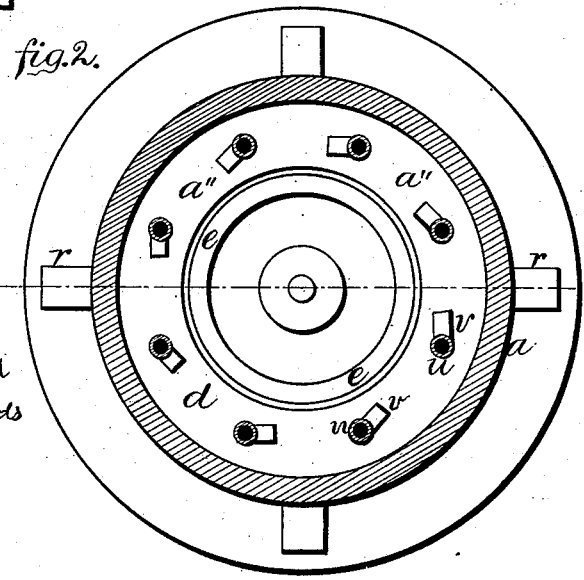
Witnesses:
R. F. Gaylord
Wm. E. Simonds
Inventor:
George H. Moore

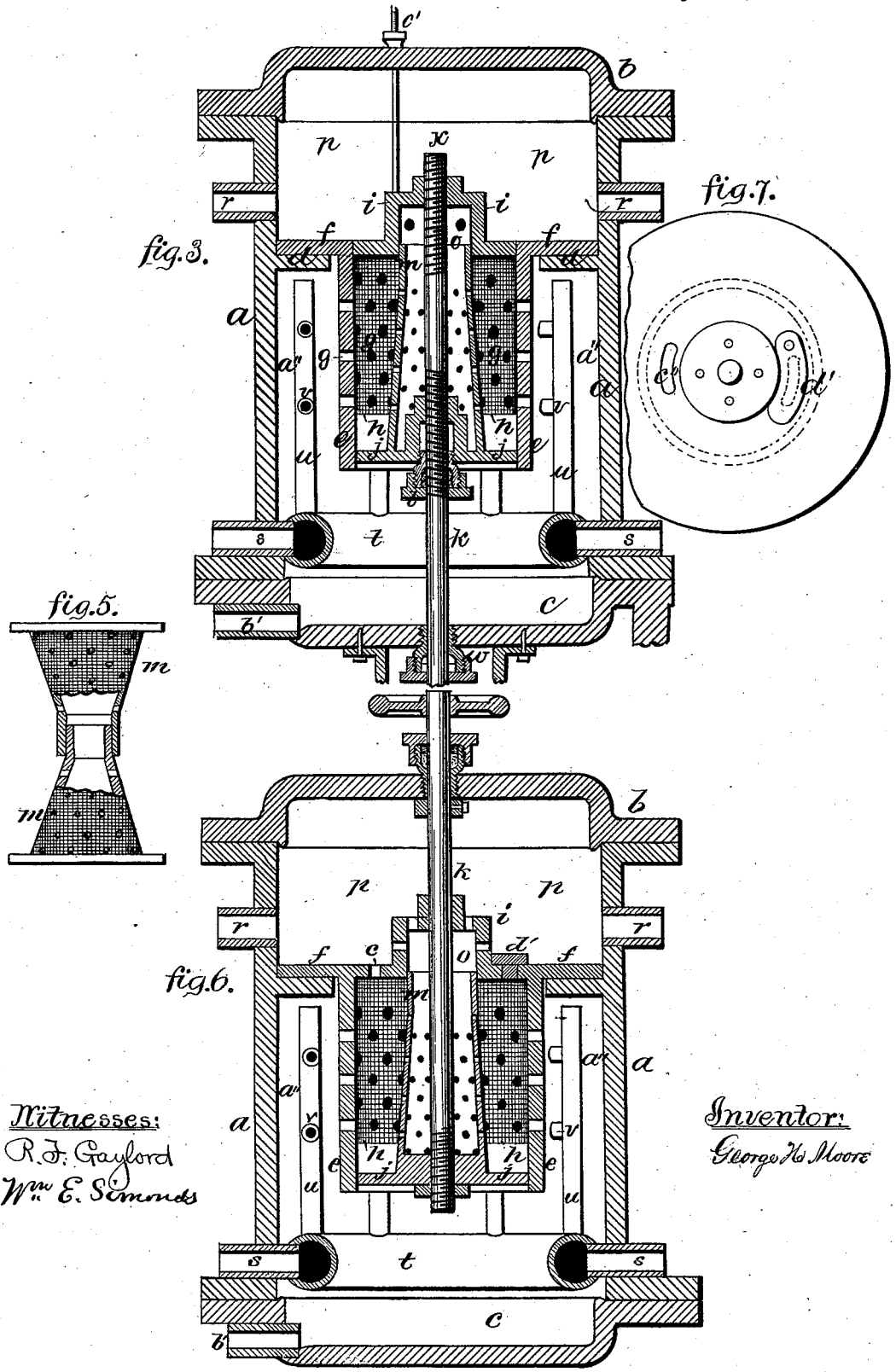

(No Model.) 3 Sheets—Sheet 3.

G. H. MOORE.
FILTER.

No. 244,471. Patented July 19, 1881.

Witnesses:
R. F. Gaylord
Wm E. Simonds

Inventor:
George H. Moore

UNITED STATES PATENT OFFICE.

GEORGE H. MOORE, OF NORWICH, CONNECTICUT.

FILTER.

SPECIFICATION forming part of Letters Patent No. 244,471, dated July 19, 1881.

Application filed April 30, 1880. (No model.)

*To all whom it may concern:*

Be it known that I, GEORGE H. MOORE, of Norwich, in the county of New London and State of Connecticut, have invented a certain new and useful Improvement in Filtering-Machines; and I do hereby declare the following to be a full, clear, and exact description of my invention, such as will enable others skilled in the art to which it pertains to make and use it, reference being had to the accompanying drawings, which form a part of this specification.

My invention relates to the art of filtration, and its use is to separate a fluid from any undissolved particles or solid matter contained therein. Its object is the formation, construction, and arrangement of a machine to the ends that the filtration of fluids can be accomplished by its use with certainty, celerity, and permanence, and that its various operations—required under the conditions above stated to continuously furnish a clear filtrate from the fluid operated upon—shall be under the control of the operator.

Therefore my invention consists as follows: in one or more compressors of such form and arrangement within the machine relative to relating parts, also to each other, that by the designed movement of either one or more of these compressors a mass of loose filtering material in suitable position—preferably finely divided animal-charcoal—shall be compressed vertically, and from its longitudinal center laterally, or, to speak more generally, in differing directions not in line, into the form of a cylinder having a conical or semi-conical opening through it, or into an equivalent form, and held therein, the above-described first movement of the compressor or compressors at the same time diminishing the dimensions of the chamber containing the loose filtering material in position both vertically and laterally, or in differing directions not in line, and by thus compressing the loose filtering material forming interstices between the particles thereof of a proper character and magnitude for the purpose desired—*i. e.*, to separate a fluid from any undissolved particles or solid matter contained therein; also, for the purpose of cleansing, by the reverse movement of the compressor or compressors, enlarging the dimensions of the chamber containing the compressed mass of loose filtering material both in a vertical and lateral direction, or in differing directions not in line, thereby allowing the particles of the compressed mass of loose filtering material to move by their own gravity, or to be moved by the action of the fluid forced between them, whereby any undissolved particles or solid matter in the unfiltered-fluid chamber, or that may have entered some of the interstices of the compressed mass of loose filtering material during the process of filtration, are driven or carried out and away from the machine by the flow of the liquid used for the purpose above mentioned—*i. e.*, the purpose of cleansing.

It further consists, in order to produce tumultuous movement or motion of the unfiltered fluid in the machine at or on the surface of the compressed loose filtering material, in what I designate as the "extra unfiltered-fluid receptacle," (which is preferably placed or formed within the machine to first receive the fluid that is to be filtered,) and in conveying the unfiltered fluid therefrom through one or more pipes connected with the extra unfiltered-fluid receptacle to the surface of the filtering material, with which the above-described receptacle and conveying-pipes may be combined, the outlet or outlets of these conveying-pipes being so constructed and arranged that the unfiltered fluid forced through them is projected in jets or streams with a positive force upon the filtering-surface, thus producing the desired effect; and, further, in the manner and in the arrangement of parts of the machine for the purpose of removing from position and renewing the loose filtering material used; also, in an indicator, exteriorly visible, for the purpose of indicating the precise position of the compressor or compressors within the machine, and consequently the condition of compactness of the filtering material; also, in the form, construction, and arrangement of the parts of the machine, whereby its operations are made certain and effective and are under the control of an operator, all of which is hereinafter more fully described.

Figure 1 is an elevation view of a machine or apparatus embodying my invention. Fig. 2 is a view of the same in cross-section on plane *x x*, looking upward. Fig. 3 is a view of the same in central vertical section. Fig. 4 is a detail elevation view of the cone-frustum compressor hereinafter described, shown as appurtenant to one of the end compressors. Fig. 5 is a detail elevation view of a modification, showing two cone-frustum compressors arranged to work together. Fig. 6 is a view in central vertical section of a modified form of apparatus embodying my invention, designed for use when smaller filtering capacity is required. Fig. 7 is a detail top view of the filtering-compartment shown in Fig. 6. Fig. 8 is a central sectional view of a modified form of apparatus.

The letter $a$ denotes the outer case of the machine—a hollow cylinder with flanged extremities—to which the heads $b$ and $c$ are suitably attached by any proper means.

The letter $d$ denotes a flange within the case $a$, furnishing a support for the filtering-cylinder $e$ through the medium of the flange $f$, appurtenant thereto. The wall of the filtering-cylinder is perforated by holes $g$, and the inner side of this wall bears the strainer-lining $h$, of fine wire-cloth or the like.

The letter $i$ denotes an end compressor fitting and moving (in adjustment) within the filtering-cylinder.

The letter $j$ denotes another and generally similar end compressor fitting and moving within the filtering-cylinder in the same general manner. These two end compressors are both borne on the threaded shaft $k$, the two threads being one a right-hand and one a left-hand, so that on rotating the shaft they will approach or recede from each other simultaneously. The lower end compressor is provided with the stuffing-box $l$ to prevent the passage of fluid at this point. The lower end compressor bears the hollow-cone frustum $m$, the wall of which is perforate and outwardly coated with a strainer-lining, $n$, of fine wire-cloth or the like. The loose filtering material is contained within the chamber formed by the filtering-cylinder, the upper and lower end compressors, and the hollow-cone frustum, and the fluid is filtered by passing from the outside of the filtering-cylinder through the perforations in the cylinder-wall and through the filtering material to the inside of the hollow-cone frustum. The upper end compressor bears the annular recess $o$, within which fits and (in adjustment) slides the regular-shaped upper end of the cone-frustum. The wall of this annular recess is perforate, and through these perforations the filtered fluid finds access to the filtered-fluid chamber $p$, from whence it is taken off by pipe or pipes $r$ to desired points. The unfiltered fluid finds access to the machine through pipe or pipes $s$ to a preferably annular unfiltered-fluid receptacle, $t$, whence it flows up through conveying-pipes $u$, which rise from the extra unfiltered-fluid receptacle $t$ at suitable intervals, and are provided with outlets $v$ into the receptacle $a''$, whereby the outgoing fluid is projected in jets or streams with a positive force upon the surface of the filtering-compartment and filtering material therein, thus causing a tumultuous movement or motion of the fluid immediately at or upon the filtering-surface, which tends to prevent the surface of the filtering material from being rapidly coated or clogged. These outlets may be set to direct the outgoing fluid at any desired angle or direction to the surface of the filtering-cylinder and the filtering material. The desired object and use of these conveying-pipes with their outlets are not to create a current around the compartment containing filtering material, but to produce a broken or tumultuous condition of the fluid immediately at or upon the filtering-surface. This is effected by forcing the fluid through induction-pipes into the extra unfiltered-fluid receptacle, and from thence through the conveying-pipes and their outlets out upon the filtering-surface. At the same time the superficial area of the orifices of the induction-pipes leading into the extra unfiltered-fluid receptacle, the conveying-pipes, and their outlets leading therefrom should be regulated and proportioned as follows—i. e., the superficial area of the orifice of the induction-pipe should be slightly greater than the combined superficial area of the receiving-orifices of the conveying-pipes, and the combined superficial area of their outlets should be slightly less than the combined superficial area of their receiving-orifices. To further explain: If the superficial area of the orifice of the induction-pipe discharging into the extra unfiltered-fluid receptacle is seven square inches, the combined superficial area of the receiving-orifices of the conveying-pipes connected with the extra unfiltered-fluid receptacle should not exceed six and one-half square inches, and the combined superficial area of the orifices of the outlets of the conveying-pipes should not exceed six square inches. The preferably annular extra unfiltered-fluid receptacle should be of such diameter that its receiving-orifice is of greater superficial area than the orifice of the induction-pipe connected therewith and through which the unfiltered fluid is discharged therein; also, it should be of such lineal dimensions that the maximum number (which is regulated as hereinbefore described) of conveying-pipes can be connected therewith. The orifices of the outlets of the conveying-pipes are preferably arranged at the distance of one-eighth of an inch from the filtering-surface.

The object of the described regulation of the superficial area of the orifices of the induction-pipe, the extra unfiltered-fluid receptacle, the conveying-pipes, and their outlets is to furnish to the receiving-orifices of the conveying-pipes and the discharging-orifices of their outlets an excess of supply of the fluid operated upon, for reasons readily understood. The reasons for arranging the discharging-orifices of the conveying-pipes at such a short distance from the filtering-surface are as follows: It will be seen, as herein shown and described, that the compartment for containing filtering material is suspended in that particular unfiltered-fluid receptacle of this filtering apparatus herein located, and designated by the letter $a''$, and that that receptacle must fill with the fluid before the requisite pressure of the same upon the filtering-surface can be obtained. Therefore the fluid forced into the extra unfiltered-fluid receptacle and from thence through the conveying-pipes and their outlets, upon issuing into the filled receptacle, produces a tumultuous movement or motion of a portion of the fluid therein for a limited distance in front of these orifices, and from their nearness thereto, immediately at or upon the filtering-surface. By increasing the distance between the filtering-surface and the discharging-orifices of the conveying-pipes the same tumultuous movement or motion of the fluid at a limited distance from these orifices can be obtained; but its effect upon the filtering-surface is lessened and gradually lost as the distance between them is gradually increased. The maximum force and capacity of the jet or stream issuing from these orifices into the full receptacle $a$ to produce the desired and described effect are at the orifice from which it issues. Therefore the discharging-orifices of the conveying-pipes are arranged (when the condition of the fluid operated upon will allow it) as near as practicable to the filtering-surface, but not in contact therewith. Other variations of these orifices may be made without departing from the spirit of my invention; but the above illustrations are deemed sufficient to make clear how the variations should be made.

The tumultuous or broken condition of the fluid hereinbefore described is produced in its maximum intensity only when the orifices are regulated and proportioned as hereinbefore described. A variation of these orifices from their proper proportions to each other—such as enlarging the orifices of the outlets of the conveying-pipes until their combined superficial area exceeds that of either of the other specially-mentioned orifices pertaining thereto—negatives the positive force with which the fluid issues from the orifices of the outlets of the conveying-pipes when their combined superficial area does not exceed, but is preferably less than, that of the other pertaining orifices.

The celerity with which the fluid passes through a filter is governed in part by the thickness of the mass of filtering material therein. Therefore, as an aid to rapid filtration and a certain and rapid cleansing of the filtering material in position, the compartment for containing filtering material is preferably made cylindrical in form and provided with a compressor extending through the filtering-compartment and filtering material therein and working in contact and in adjustment with another compressor, also arranged above it in the filtering-compartment, but not extending into the filtering material, or a compressor extending into the filtering-compartment and filtering material therein and working in contact and in adjustment with another compressor of preferably similar form and similarly arranged. Neither of these two compressors, of itself, extends through the filtering compartment. All of the described arrangements of compressors in this filtering-machine are illustrated in the drawings. The compressors extending into or through the filtering-compartment and filtering material therein govern the thickness of the mass of filtering material through which the fluid operated upon must pass, as well as the containing capacity of the filtering-compartment, also the interior form of the mass of filtering material by which they are surrounded.

The receptacle $t$ is the one I have preliminarily referred to as the "extra" unfiltered-fluid receptacle, and is of special utility when the fluid to be filtered is heavily or unusually loaded with solid matter; otherwise the unfiltered fluid may be admitted directly to the receptacle $a''$ without the intervention of the extra receptacle and the conveying-pipes.

The shaft $k$ passes out through the lower head, $c$, there being a stuffing-box, $w$, at its joint of passage to prevent escape of fluid. At or near its lower end this shaft is provided with the bevel-gear $y$, into which meshes the bevel-pinion $z$, borne on the same shaft as the hand-wheel $a'$, by the rotation of which shaft $k$ may be operated.

It is obvious that by causing the two end compressors to approach each other the confined loose filtering material will be pressed closer and closer and the filtering-interstices made smaller and smaller. It is also obvious that as the lower end compressor bearing the cone-frustum advances the filtering material will be pressed closer and closer between it and the wall of the filtering-cylinder, and that by this simple form of apparatus I accomplish the pressing together of the filtering material in two different directions—that is, longitudinally between the upper and lower end compressors and laterally between the cone-frustum and the filtering-cylinder wall. It is also obvious that by causing the end compressors to recede from each other the mass of the filtering material is loosened up in differing directions, so that a current passed through the machine, either directly or reversely, will find the particles of filtering material free to move about and amenable to the cleansing operation. To clear the filtering-chamber of filtering material, the lower-end compressor is receded until the lower end of the filtering-cylinder is open, through which the filtering material can escape and be drawn off and away through pipe $b'$. To put in new filtering material, the head $b$ is removed and the upper-end compressor. The two flanged cone-frustums shown in Fig. 5 can be used, one as a lower-end compressor and one as an upper-end compressor.

The letter $c'$ denotes an indicating-rod appurtenant to a movable end compressor passing outside the casing, (where it may be graduated,) to denote the position of the compressors and the compactness of the filtering material.

In the modification of this apparatus shown in Figs. 6 and 7 there is but one movable end compressor, the other end compressor being stationary and adapted to receive the regularly-shaped end of the frusto-conical compressor, and the top plate of the filtering-cylinder has the orifices $c''$ $c''$ for putting in the filtering material ordinarily closed by the caps $d'$.

I desire also to be understood that when in the following claims I mention "end compressors" (plural) I mean one or more end compressors—that is, one of the end compressors may be stationary.

When only one hollow frusto-conical compressor is used, it is of greater longitudinal dimension than the filtering-compartment in which it is arranged; but when two hollow frusto-conical compressors are used each is of a less longitudinal dimension than the filtering-compartment.

The extra unfiltered-fluid receptacle, instead of being an annular chamber, may be otherwise formed in the casing—as, for instance, as shown in Fig. 8.

In Fig. 6, which shows but one movable end compressor, the regularly-shaped end of the frusto-conical compressor is adapted to enter a stationary part or compressor, which is provided with a recess for the reception of the same, and which is also suitably perforated for the discharge of the filtered fluid from the hollow-cone compressor.

I claim as my invention—

1. In a filtering apparatus, the combination, with an outer casing, of a compartment for filtering material and a flanged frusto-conical compressor containing a chamber for the reception and delivery of the filtered fluid, said compressor entering the body of the filtering material and adapted to be moved vertically, substantially as described.

2. In a filtering apparatus, the combination, with a cylindrical compartment having perpendicular walls and adapted to contain filtering material, of a hollow flanged frusto-conical compressor extending through said compartment and the filtering material and adapted to be moved vertically, whereby the filtering material is compressed in both a vertical and lateral direction, substantially as set forth.

3. In a filtering apparatus, a compartment for containing a filtering material, in combination with a movable compressor of greater longitudinal dimension than said compartment, whereby the containing capacity of the compartment and the interior form of the inclosed mass of filtering material are defined, substantially as set forth.

4. In a filtering apparatus, the combination, with an outer casing, of a compartment for filtering material and two movable hollow compressors, one in each end of said compartment, and arranged so that the end of one compressor shall pass within the hollow end of the other, and mechanism for operating the same, substantially as shown and described.

5. In a filtering apparatus, the combination, with an outer casing, of two receptacles or chambers for the reception of unfiltered fluid, both of them being enveloped by said outer casing and one of them enveloped by the other, substantially as shown and set forth.

6. In a filtering apparatus, the combination, with the outer casing, of a compartment for the filtering material provided with a compressor, and upright conveying-pipes inclosed within said outer casing and arranged in close proximity to the compartment containing the filtering material and around the same, and means for supplying said pipes with fluid, substantially as set forth.

7. In a filtering apparatus, an indicator-rod, in combination with the movable parts of the filtering-compartment and extending to the outside of the exterior casing, substantially as set forth.

8. In a filtering apparatus, the combination of the outer casing, having an internal flange, the induction-pipes, the extra unfiltered-fluid receptacle provided with conveying-pipes, the compartment for filtering material, the compressors, and means for operating the same, substantially as set forth.

GEORGE H. MOORE.

Witnesses:
R. F. GAYLORD,
W. E. SIMONDS.